UNITED STATES PATENT OFFICE.

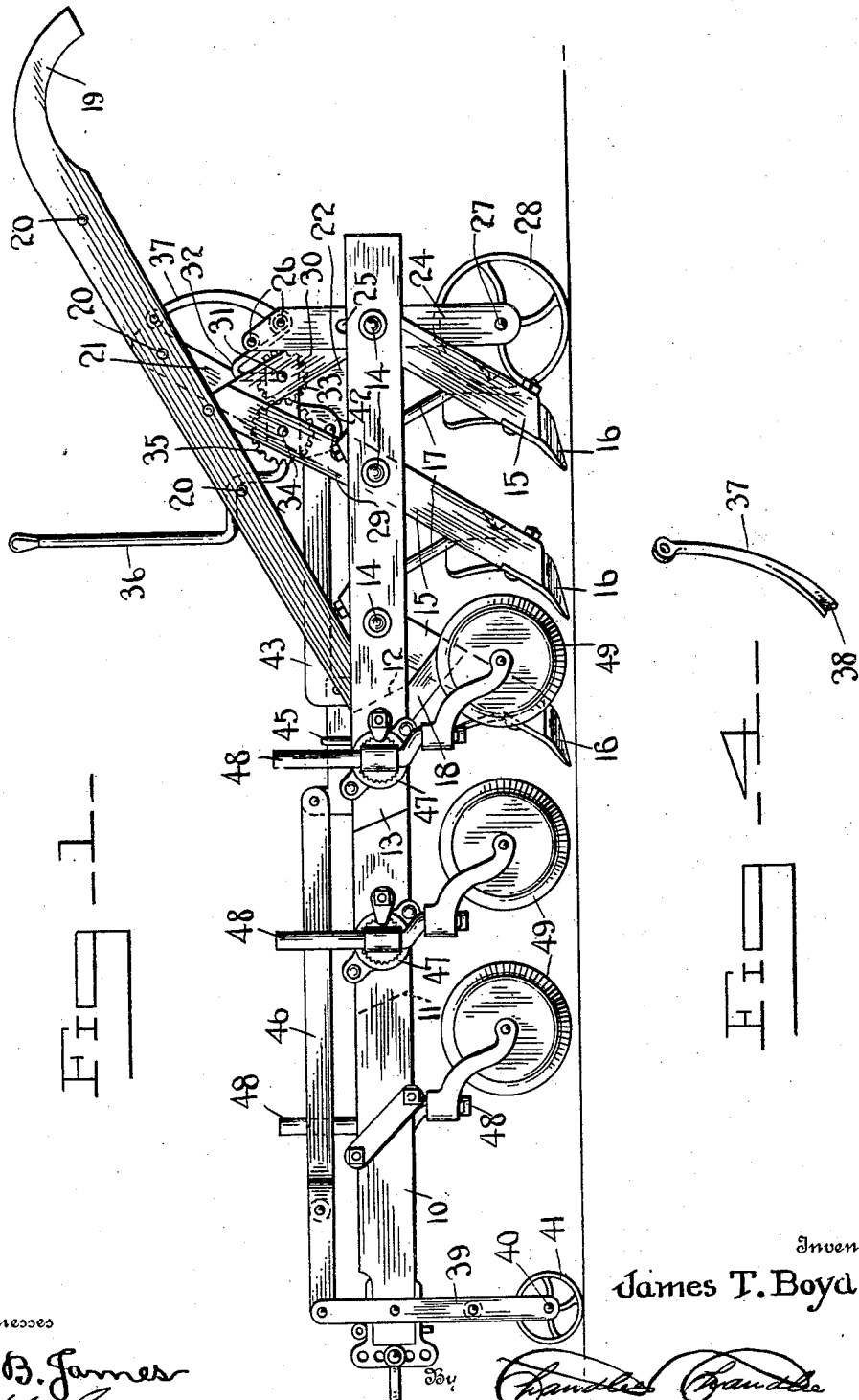

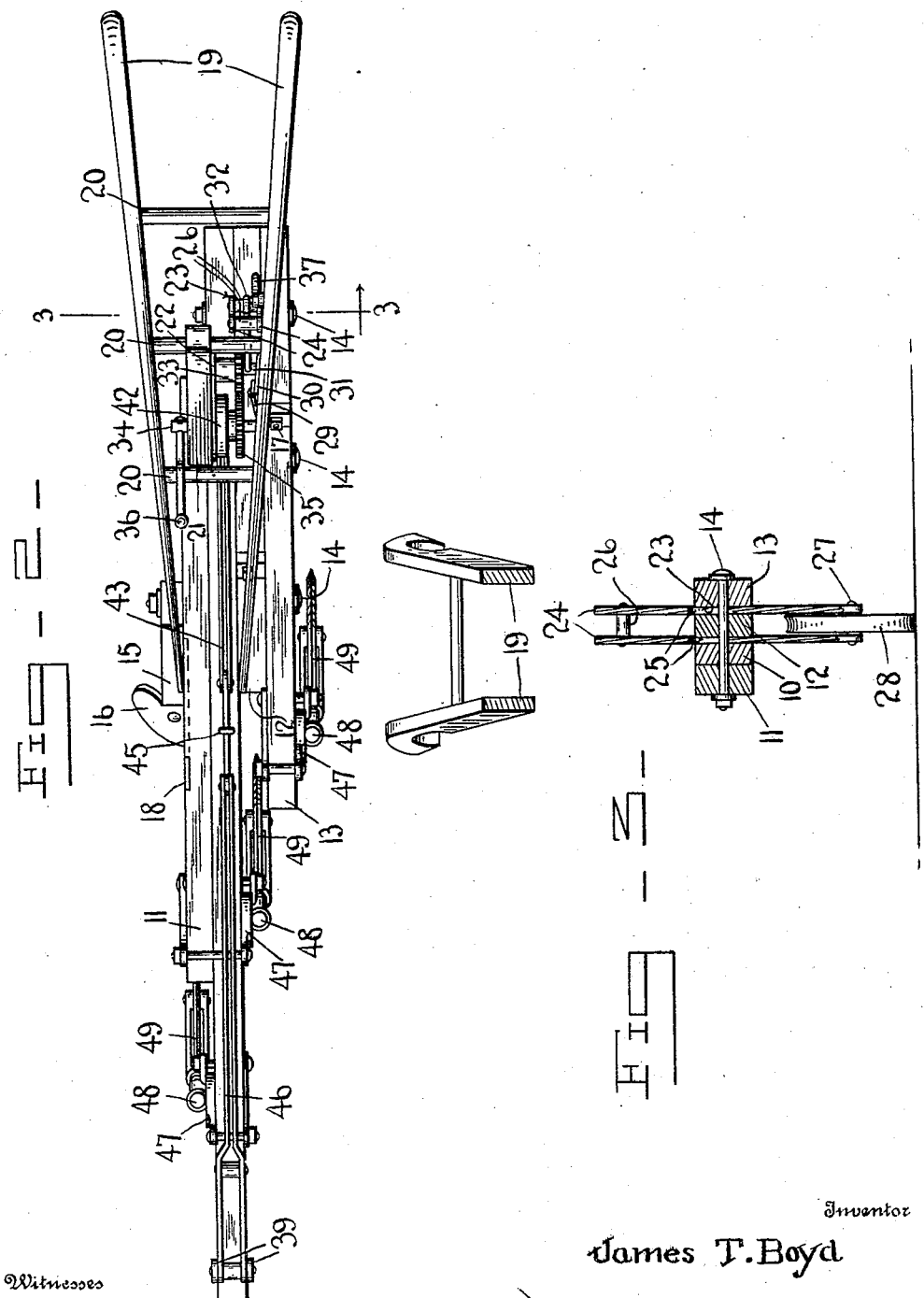

JAMES T. BOYD, OF SPRINGVILLE, MISSISSIPPI.

PLOW.

969,243.  Specification of Letters Patent.  Patented Sept. 6, 1910.

Application filed March 11, 1909. Serial No. 482,726.

*To all whom it may concern:*

Be it known that I, JAMES T. BOYD, a citizen of the United States, residing at Springville, in the county of Pontotoc, State of Mississippi, have invented certain new and useful Improvements in Plows; and I do hereby declare the following to be a full, clear, and exact description of the invention, such as will enable others skilled in the art to which it appertains to make and use the same.

This invention relates to plows and has special reference to a plow provided with front and rear wheels arranged to regulate the depth of cut.

One of the objects of this invention is to provide a novel and efficient means for supporting the various earth working elements and wheels in a plow of this character.

A second object of the invention is to provide a novel means of regulating the position of the depth gaging wheels.

A third object of the invention is to improve the general structure of the frame of a plow of this character.

The fourth object of the invention is to provide a novel form of rear wheel standard especially adapted for use with this invention.

With the above and other objects in view the invention consists in general of beam supporting earth working tools, front and rear standards carrying wheels and means to raise or lower said wheels relative to said beam.

The invention further consists of certain novel details of construction and combinations of parts hereinafter fully described, illustrated in the accompanying drawings, and specifically set forth in the claims.

In the accompanying drawings, like characters of reference indicate like parts in the several views, and:—

Figure 1 is a side elevation of a plow constructed in accordance with this invention. Fig. 2 is a top plan view thereof. Fig. 3 is a detail sectional view on the line 3—3 of Fig. 2. Fig. 4 is a detail view showing the catch used to hold the rear standard in its depressed position.

The numeral 10 indicates the main beam of the plow and upon one side of this is secured an auxiliary beam 11, while upon the other side is also secured a pair of auxiliary beams 12 and 13. All of these beams are securely bolted together by means of bolts 14.

At 15 are indicated the standards which serve to support earth working tools of any desired form or shape as shown at 16. These standards are rigidly connected to the beam and securely braced thereto by means of bolts 17 and braces 18. Extending upward from the beams are handles 19 which are suitably spaced by means of transverse braces 20. A brace 21 extends upward from the beam and has its upper end secured to one of the transverse braces 20. A second brace 22 is also secured to the beam and extends upward to one of the handles 19.

Toward the rear end of the beam 12 this beam is chamfered as indicated at 23 so that the sides thereof are in spaced relation to the beams 10 and 13, thus making a pair of spaced slots. Extending through these slots are a pair of plates 24 provided with a longitudinally disposed slot 25 through which one of the bolts 14 passes. The upper end of these plates are held in spaced relation by suitable bolts 26 and at the lower end of the plates is tied an axle 27 whereon is mounted a wheel 28.

Braces 29 and 30 are connected at their lower ends to the beams and at their upper ends to the braces 22 and 21, respectively. Between the braces 29 and 30 extends a rotatable shaft 31 having secured thereto an arm 32 which extends up over the front bolt 26 and then down, being pivotally attached to the rear bolt 26. Upon the shaft 32 is mounted a gear 33. A shaft 34 extends between the braces 22 and 21 and upon this shaft is mounted a gear 35 which meshes with the gear 33 previously described. A lever 36 is attached to the shaft 34 for the purpose of rotating the same. It will now be obvious that as the lever 36 is moved backward and forward the shaft 31 will be caused to revolve and raise or lower the wheels 28. In order to hold the wheel in its lowermost position without strain on the gears there is provided a swinging latch 37 having a notch 38 therein adapted to engage one of the bolts 26 when the wheel 28 is forced down by the movement of the lever. To the forward end of the beam 10 there is pivoted a pair of bars 39 extending above and below the beam and having at their lower ends an axle 40 supporting a wheel 41. Mounted on the axle 34 is a rock lever 42 having a reach rod 43 connected thereto. The free end of the reach rod 43 is connected to a bar which slides through a guide 45 mounted on the beam 10. The other end of this bar is connected by a reach rod 46 to the upper end of the members 39. Suitably positioned on the beams are plates 47 carrying standards 48 on the lower ends of which are roller colters 49. These standards and colters are of the ordinary adjustable type.

In the operation of the device it will be noted that when the lever is pushed forward the wheels 28 and 41 will be forced down so that the earth working tools will be raised from contact with the earth and the plow allowed to move thereover without tearing up the sod or the road over which it is being drawn. When, however, the lever is drawn backward the wheels are raised and the tools allowed to enter the earth, the proper depth being regulated by means of the position of the lever. It will be noted that this operation is very simple, being performed simultaneously by one movement of the lever.

There has thus been provided a simple and efficient device of the kind described and for the purpose specified.

It is obvious that many minor changes may be made in the form and construction of this invention without departing from the material principles thereof. It is not, therefore desired to confine the invention to the exact form herein shown and described, but it is wished to include all such as properly come within the scope thereof.

Having thus described the invention, what is claimed as new, is:—

1. The combination with a plow beam having handles fixed to the rear end thereof; of a front wheel, a standard carrying said wheel pivoted to the front of said beam, a shaft rotatably mounted at the rear of said beam, a hand lever fixed on said shaft to form means to rotate the same, a rock lever fixed on said shaft, a reach rod connected to the rock lever and extending forward along said beam, a bar connected to the free end of the reach rod and projecting forward therefrom, a guide for said bar fixed to said beam, and a second reach rod connecting the forward end of the bar to the pivoted standard.

2. The combination with a plow beam having handles fixed to the rear end thereof; of a front wheel, a standard carrying said wheel pivoted to the front of said beam, a shaft rotatably mounted at the rear of said beam, a hand lever fixed on said shaft to form means to rotate the same, a rock lever fixed on said shaft, a reach rod connected to the rock lever and extending forward along said beam, a bar connected to the free end of the reach rod and projecting forward therefrom, a guide for said bar fixed to said beam, a second reach rod connecting the forward end of the bar to the pivoted standard, a rear wheel, a second standard at the rear of said beam carrying said rear wheel, and means connected to said shaft to raise or lower the rear wheel as the shaft is rotated.

In testimony whereof, I affix my signature, in presence of two witnesses.

JAMES T. BOYD.

Witnesses:
S. A. SALMON,
G. W. BOYD.